(12) United States Patent
Kim et al.

(10) Patent No.: US 11,613,166 B2
(45) Date of Patent: Mar. 28, 2023

(54) AIR VENT DEVICE FOR VEHICLE

(71) Applicants: HYUNDAI MOTOR COMPANY, Seoul (KR); KIA MOTORS CORPORATION, Seoul (KR); HYUNDAI MOBIS CO., LTD., Seoul (KR)

(72) Inventors: Joo Hwa Kim, Hwaseong-si (KR); Seung Cheol Kim, Yongin-si (KR); Won Sik Kim, Yongin-si (KR)

(73) Assignees: HYUNDAI MOTOR COMPANY, Seoul (KR); KIA MOTORS CORPORATION, Seoul (KR); HYUNDAI MOBIS CO., LTD., Seoul (KR)

( * ) Notice: Subject to any disclaimer, the term of this patent is extended or adjusted under 35 U.S.C. 154(b) by 169 days.

(21) Appl. No.: 16/904,951

(22) Filed: Jun. 18, 2020

(65) Prior Publication Data
US 2021/0260968 A1 Aug. 26, 2021

(30) Foreign Application Priority Data
Feb. 24, 2020 (KR) ........................ 10-2020-0022284

(51) Int. Cl.
*B60H 1/34* (2006.01)
(52) U.S. Cl.
CPC ................................ *B60H 1/3414* (2013.01)

(58) Field of Classification Search
CPC .......... B60H 1/3414; B60H 2001/3471; B60H 1/00871
See application file for complete search history.

(56) References Cited

U.S. PATENT DOCUMENTS

2018/0215238 A1\* 8/2018 Lee ...................... B60H 1/3421

FOREIGN PATENT DOCUMENTS

| DE | 102007037273 | A1 | 4/2008 | |
|---|---|---|---|---|
| DE | 102010008377 | A1 | 8/2011 | |
| DE | 10201805747 | A1 | 9/2019 | |
| DE | 102019106871 | A1 | 9/2020 | |
| EP | 1705041 | A1 \* | 9/2006 | ........... B60H 1/3421 |
| KR | 2019-0131251 | A | 11/2019 | |
| KR | 2020-0017069 | A | 2/2020 | |

\* cited by examiner

*Primary Examiner* — Jessica Yuen
(74) *Attorney, Agent, or Firm* — McDonnell Boehnen Hulbert & Berghoff LLP

(57) ABSTRACT

An air vent device for a vehicle includes an upper air guide wing and a lower air guide wing are mounted within an air duct to be rotatable vertically, and an air guide control plate, which vertically rotates the upper and lower air guide wings by driving an actuator, is mounted at the side position of the air duct, thereby easily controlling the vertical wind direction of the air by the rotation of the upper air guide wing or the lower air guide wing which interlocks when the air guide control plate rotates.

9 Claims, 6 Drawing Sheets

AIR VENT DEVICE FOR VEHICLE

CROSS REFERENCE TO RELATED APPLICATIONS

This application claims under 35 U.S.C. § 119(a) the benefit of priority to Korean Patent Application No. 10-2020-0022284 filed on Feb. 24, 2020, the entire contents of which are incorporated herein by reference.

BACKGROUND

(a) Technical Field

The present disclosure relates to an air vent device for a vehicle, and more particularly, to a motor-driven air vent device for a vehicle, which may easily control the vertical wind direction of the air, discharged to the interior of the vehicle, by using a pair of air guide wings or the like.

(b) Background Art

Generally, an air vent which discharges air into the interior of a vehicle by an operation of an air conditioner for a vehicle includes a center air vent which is mounted to a center fascia panel between the front surfaces of the driver seat and the passenger seat, side vents which are mounted to crash pads on the front surface sides of the driver seat and the passenger seat, and the like.

Although an existing air vent may be formed of a structure with a large vertical height while the numbers of horizontal wings and vertical wings thereof are each at least 5 or 6, thereby easily controlling the direction of the air, discharged to the interior of the vehicle, toward the passenger's body, there is a drawback in that the size of the air vent is inevitably increased, thereby affecting the package problem with the peripheral components and the design constraint conditions.

Furthermore, as the driver needs to operate the air vent by directly and vertically bending back a knob, which is attached to a horizontal wing among components of the existing air vent, to control the vertical wind direction, the driver may not pay attention to the front temporarily, thereby also causing a problem in running safety.

In addition, since the existing air vent has a structure in which numerous horizontal wings and vertical wings are inevitably exposed in appearance, the air vent occupies a wide mounting space in the center fascia panel or the crash pad, thereby eventually degrading the degree of freedom of a cluster, an AVN device, and the like, which are disposed around the air vent.

Accordingly, due to the enlargement of the cluster and the Audio, Video, Navigation (AVN) device mounted in the vehicle interior, the mounting position of the air vent tends to move to the lower region of the center fascia panel, and particularly, a slim-type air vent in which the exterior design of the air vent has a low vertical height and a long horizontal length is being applied.

However, the slim-type air vent has a drawback in that it is not possible to conveniently control the vertical wind direction of the air discharged to the interior of the vehicle.

For example, as the slim-type air vent has a structure in which only a single horizontal wing is mounted to the exit position of the air duct so as to be exposed to the outside, it is inconvenient for the driver to directly hold and operate the single horizontal wing with his or her hand in order to control the vertical wind direction.

The above information disclosed in this Background section is only for enhancement of understanding of the background of the disclosure and accordingly it may contain information that does not form the prior art that is already known in this country to a person of ordinary skill in the art.

SUMMARY

The present disclosure is intended to solve the above conventional problems, and an object of the present disclosure is to provide an air vent device for a vehicle, in which an upper air guide wing and a lower air guide wing are mounted to be rotatable vertically within an air duct, and an air guide control plate, which vertically rotates the upper and lower air guide wings by driving an actuator, is mounted to a side position of the air duct so that the vertical wind direction of the air may be easily controlled by the rotation of the upper air guide wing or the lower air guide wing which interlocks when the air guide control plate rotates.

The present disclosure provides an air vent device for a vehicle, including an upper air guide wing which has the rear end portion hinge-fastened to the upper portion within an air duct, a lower air guide wing which has the rear end portion hinge-fastened to the lower portion within the air duct, an upper guide pin which is formed on the front end side surface portion of the upper air guide wing, a lower guide pin which is formed on the front end side surface portion of the lower air guide wing, an air guide control plate which has the rear end portion fastened to the outer portion of the air duct to be rotatable by a rotary shaft, has an upper guide hole which is formed in the upper portion of the front end portion thereof and into which the upper guide pin is inserted, and has a lower guide hole which is formed in the lower portion of the front end portion thereof and into which the lower guide pin is inserted, and an actuator which is mounted to the outer portion of the air duct to deliver a rotational force to the rotary shaft of the air guide control plate.

Preferably, the upper guide hole of the air guide control plate into which the upper guide pin of the upper air guide wing is inserted is composed of a first upper path hole which extends in the front-rear direction, and a second upper path hole which extends while bending downward from the front end portion of the first upper path hole, and the lower guide hole of the air guide control plate into which the lower guide pin of the lower air guide wing is inserted is composed of a first lower path hole which extends in the front-rear direction, and a second lower path hole which extends while bending downward from the rear end portion of the first lower path hole.

Accordingly, when the air guide control plate is positioned at a neutral position, the lower guide pin is positioned at the end portion of the second lower path hole of the lower guide hole while the upper guide pin is positioned at the end portion of the second upper path hole of the upper guide hole, such that the lower air guide wing is in close contact with the lower portion within the air duct while the upper air guide wing is in close contact with the upper portion within the air duct, and the air is discharged in a straight direction.

In addition, when the air guide control plate is rotated at a predetermined first rotational angle downward from the neutral position, the lower guide pin is positioned at the boundary portion between the first lower path hole and the second lower path hole of the lower guide hole while the upper guide pin is positioned at the boundary portion between the first upper path hole and the second upper path hole of the upper guide hole, such that the front end portion of the lower air guide wing is rotated upward while the upper air guide wing is kept in close contact with the upper portion within the air duct, and the air is discharged in an upward direction.

In addition, when the air guide control plate is further rotated at a second rotational angle downward from the position of the first rotational angle, the lower guide pin is positioned at the end portion of the first lower path hole of the lower guide hole while the upper guide pin is positioned at the end portion of the first upper path hole of the upper guide hole, such that the lower air guide wing is in close contact with the lower portion within the air duct while the front end portion of the upper air guide wing rotates downward, and the air is discharged in a downward direction.

Preferably, an upper slot which has the same moving trajectory as the upper guide pin and a lower slot which has the same moving trajectory as the lower guide pin are formed by penetrating the side surface portion of the air duct.

In addition, an upper seating groove in which the upper air guide wing is seated and a lower seating groove in which the lower air guide wing is seated are formed on the upper portion and the lower portion within the air duct, respectively.

Accordingly, when the upper air guide wing is seated in the upper seating groove, the upper air guide wing and an upper garnish are arranged in a downward convex curve for the COANDA effect, and when the lower air guide wing is seated in the lower seating groove, the lower air guide wing and a lower garnish are arranged in an upward convex curve for the COANDA effect.

Preferably, a fastening groove, into which the front end portion of the air duct is inserted and fastened in an air tight manner, is formed in the rear surface portion of each garnish.

The present disclosure provides the following effects through the aforementioned configurations.

Firstly, when the air guide control plate is rotated at the first rotational angle downward from the neutral position, the lower air guide wing may guide the interior discharge direction of the air upward while rotating upward, thereby easily controlling the interior discharge direction of the air upward.

Secondly, when the air guide control plate is further rotated downward from the position of the first rotational angle to the position of the second rotational angle, the upper air guide wing may guide the interior discharge direction of the air downward while rotating downward, thereby easily controlling the interior discharge direction of the air downward.

Thirdly, only a pair of air guide wings and the air guide control plate may be required as compared to numerous components configuring the existing general air vent, thereby reducing the number of components and the manufacturing costs.

Fourthly, by electronically controlling the vertical wind direction of the air instead of the manual operation for the driver to manually operate the horizontal wing which is included in the existing general air vent or the slim-type air vent, it is possible to contribute to the enhancement in convenience and quality of the vehicle.

It is understood that the term "vehicle" or "vehicular" or other similar term as used herein is inclusive of motor vehicles in general such as passenger automobiles including sports utility vehicles (operation SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

BRIEF DESCRIPTION OF THE FIGURES

The above and other features of the present disclosure will now be described in detail with reference to certain exemplary embodiments thereof illustrated the accompanying drawings which are given herein below by way of illustration only, and thus are not limitative of the present disclosure, and wherein.

Figure 1:
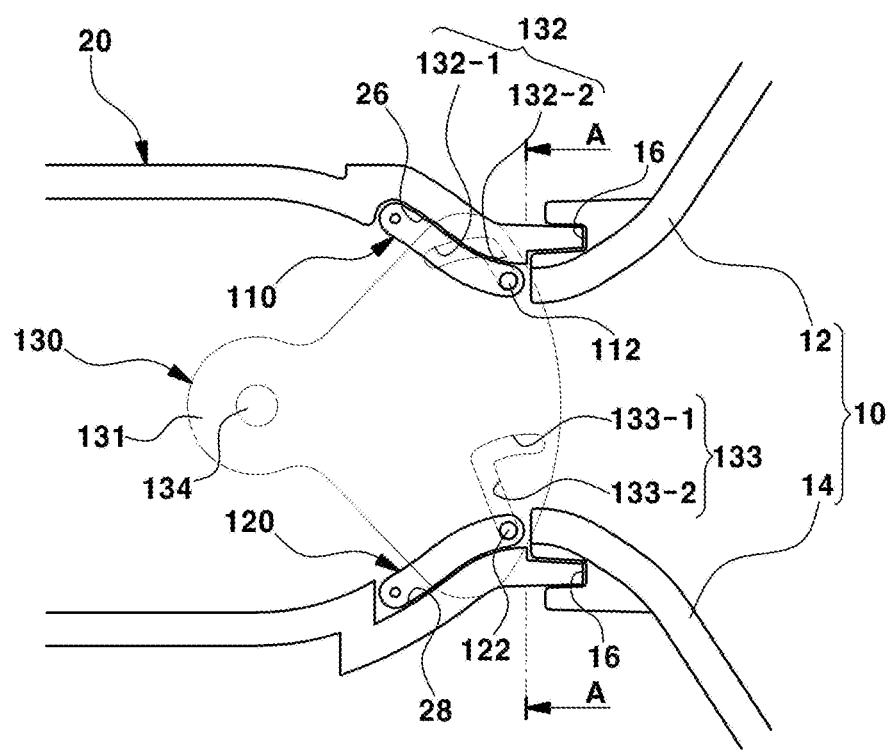
FIG. 1 is a side cross-sectional diagram illustrating an air vent device for a vehicle according to the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, positions, and shapes will be determined in section by the particular intended application and use environment.

In the figures, reference numbers refer to the same or equivalent sections of the present disclosure throughout the several figures of the drawing.

DETAILED DESCRIPTION

Hereinafter, preferred embodiments of the present disclosure will be described in detail with reference to the accompanying drawings.

Figure 2:
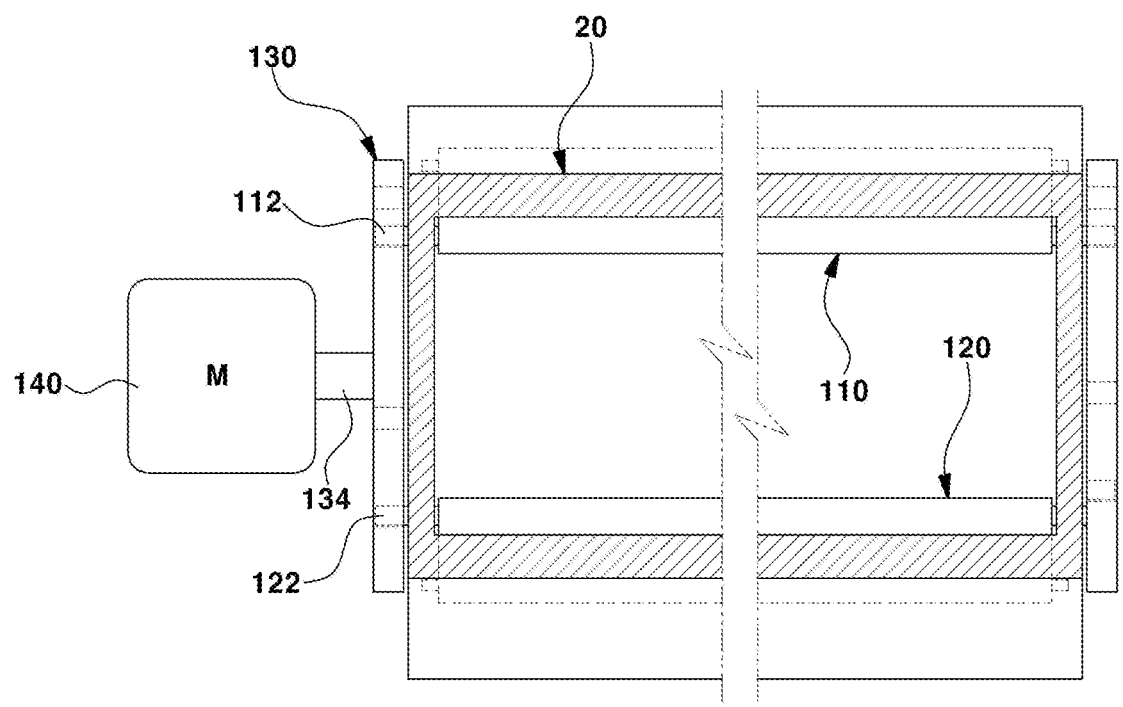
FIG. 2 is a front cross-sectional diagram taken along line A-A illustrated in FIG. 1, as the air vent device for a vehicle according to the present disclosure.

FIGS. 1 and 2 are cross-sectional diagrams illustrating an air vent device for a vehicle according to the present disclosure, and a reference numeral 10 in FIG. 1 denotes a garnish.

The garnish 10 is a kind of decoration which is mounted to the position of an air discharge port of a center fascia panel, or mounted to the position of an air discharge port of a crash pad, and is separated into an upper garnish 12 and a lower garnish 14 based on a cross-sectional structure thereof.

An air duct 20, which is an air passage from an air conditioner toward the interior of the vehicle, is connected to the garnish 10.

Preferably, the front end portion of the air duct 20 is inserted in an air tight manner and fastened into a fastening groove 16 which is formed in each of the rear surface portions of the upper garnish 12 and the lower garnish 14 configuring the garnish 10, thereby connecting the garnish 10 with the air duct 20.

Here, the rear end portion of an upper air guide wing 110 is hinge-fastened to the upper portion within the air duct 20, such that the front end portion of the upper air guide wing 110 is arranged to be rotatable vertically around the hinge fastening point of the rear end portion thereof, and the rear end portion of a lower air guide wing 120 is hinge-fastened to the lower portion within the air duct 20, such that the front end portion of the lower air guide wing 120 is arranged to be rotatable vertically around the hinge fastening point of the rear end portion thereof.

At this time, an upper guide pin 112 having a predetermined length which extends outward by penetrating the side surface portion of the air duct 20 is formed on the front end side surface portion of the upper air guide wing 110, and a lower guide pin 122 having a predetermined length which extends outward by penetrating the side surface portion of the air duct 20 is also formed on the front end side surface portion of the lower air guide wing 120.

An air guide control plate 130, which is fastened to the upper guide pin 112 and the lower guide pin 122 to deliver a rotational force to the upper air guide wing 110 and the lower air guide wing 120, is positioned at the outside of the air duct 20.

To this end, the air guide control plate 130 has a fan-shaped plate structure in which a circular hinge end 131 is formed on the rear end portion thereof, an upper guide hole 132 into which the upper guide pin 112 is inserted is formed on the upper portion of the front end portion thereof, and a lower guide hole 133 into which the lower guide pin 122 is inserted is formed in the lower portion of the front end portion thereof.

By rotatably fastening the hinge end 131 of the air guide control plate 130, described above, to the outer portion of the air duct 20 by using a rotary shaft 134, the front end portion of the air guide control plate 130 may be rotated vertically around the rotary shaft 134.

At this time, an actuator 140, such as a motor, is mounted to the outer portion of the air duct by using a bracket or the like, and an output shaft of the actuator 140 may be connected to the rotary shaft 134 to deliver a rotational force.

Accordingly, when the rotary shaft 134 is rotated by the rotation driving of the actuator 140 to vertically rotate the front end portion of the air guide control plate 130, the rotational force may be delivered to the upper air guide wing 110 through the upper guide pin 112, or the rotational force may be delivered to the lower air guide wing 120 through the lower guide pin 122.

Preferably, the upper guide hole 132 of the air guide control plate 130 into which the upper guide pin 112 of the upper air guide wing 110 is inserted is composed of a first upper path hole 132-1 which extends in the front-rear direction, and a second upper path hole 132-2 which extends while bending downward from the front end portion of the first upper path hole 132-1.

In addition, the lower guide hole 133 of the air guide control plate 130 into which the lower guide pin 122 of the lower air guide wing 120 is inserted is composed of a first lower path hole 133-1 which extends in the front-rear direction, and a second lower path hole 133-2 which extends while bending downward from the rear end portion of the first lower path hole 133-1.

Meanwhile, the upper guide pin 112 is inserted into the upper guide hole 132 of the air guide control plate 130 by penetrating the side surface portion of the air duct 20, and the lower guide pin 122 is also inserted into the lower guide hole 133 of the air guide control plate 130 by penetrating the side surface portion of the air duct 20, and then the upper and lower guide pins 112 and 122 are moved when the vertical wind direction of the air is controlled as described later. Thus, slots for such movements of the upper guide pin 112 and the lower guide pin 122 are preferably formed on the side surface portions of the air duct 20.

Figure 3:
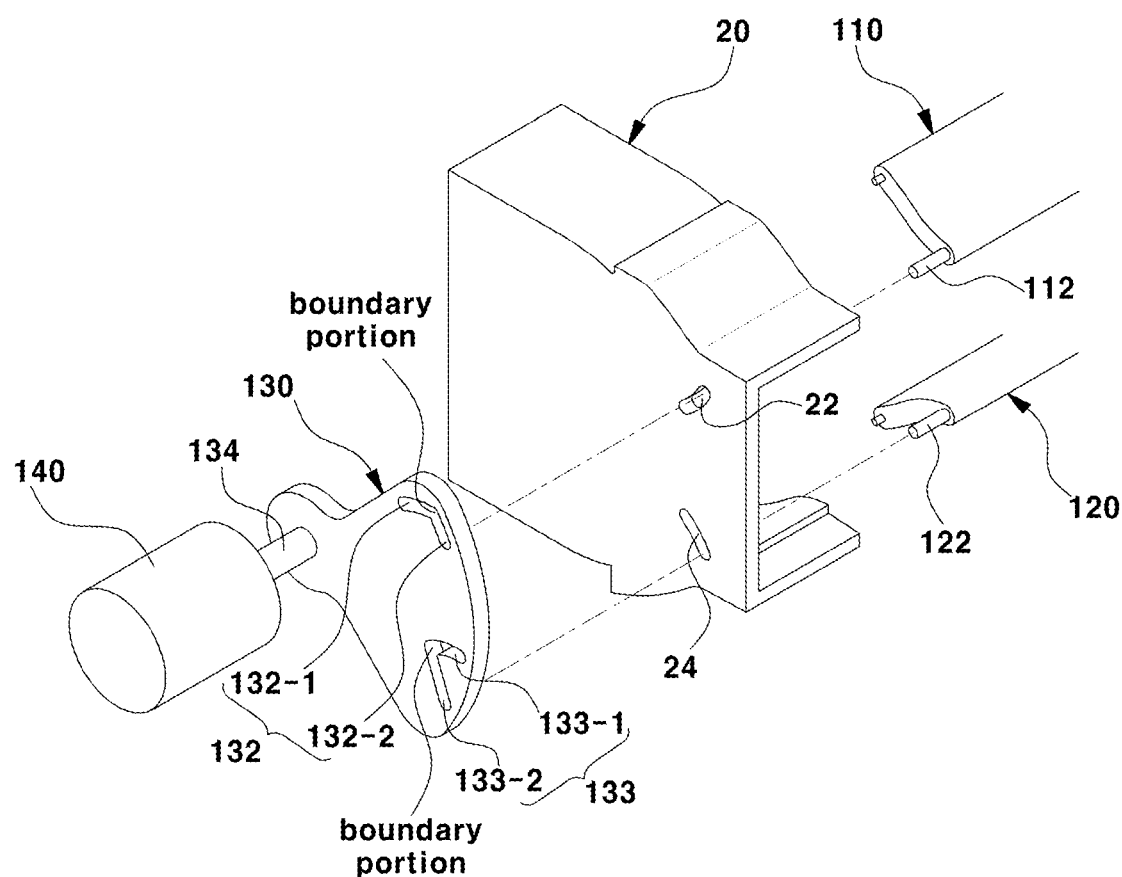
FIG. 3 is a partially enlarged diagram illustrating the connection relationship between upper and lower air guide wings and an air guide control plate among components of the air vent device for a vehicle according to the present disclosure.

To this end, as may be well seen in FIG. 3, an upper slot 22 which has the same moving trajectory as the upper guide pin 112 and a lower slot 24 which has the same moving trajectory as the lower guide pin 122 are formed by penetrating the side surface portion of the air duct 20.

Here, the operating state of the air vent device according to the present disclosure having the above configuration will be described as follows.

Control of the Air Wind Direction in Neutral Direction

Figure 4:
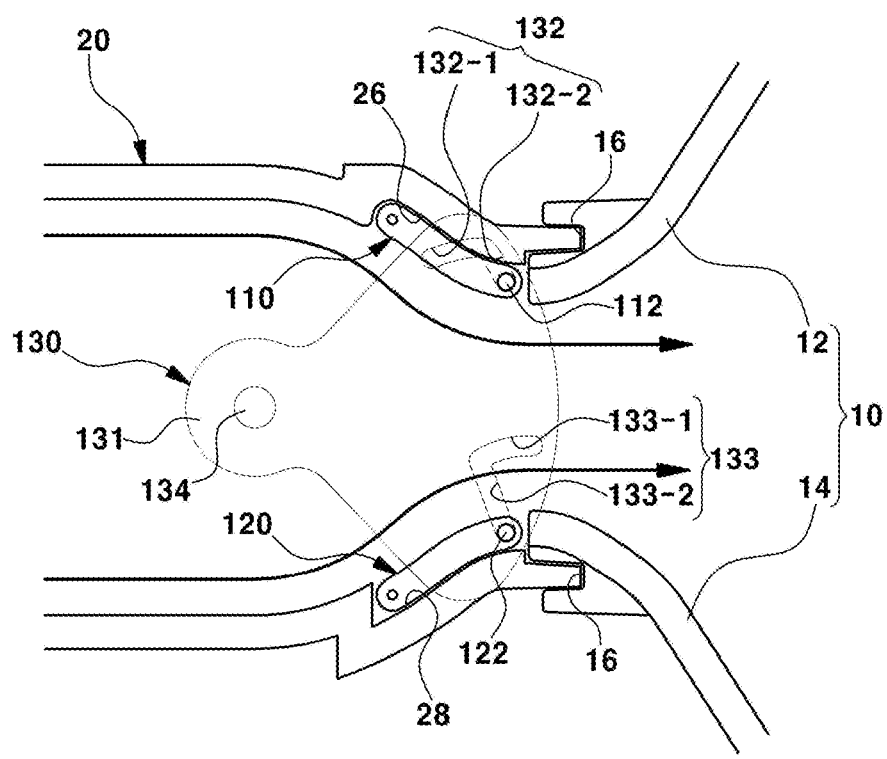
FIG. 4 is a side cross-sectional diagram illustrating a state where the air is discharged in a straight direction by the air vent device for a vehicle according to the present disclosure.

FIG. 4 is a diagram illustrating a state where the air is discharged in the neutral direction (straight direction) by the air vent device for a vehicle according to the present disclosure.

As illustrated in FIG. 4, when the air guide control plate 130 is disposed at the neutral position parallel to the longitudinal direction of the air duct 20 without being tilted upward or downward, the lower guide pin 122 of the lower air guide wing 120 is positioned on the end portion of the second lower path hole 133-2 in the section of the lower guide hole 133 of the air guide control plate 130 while the upper guide pin 112 of the upper air guide wing 110 is positioned on the end portion of the second upper path hole 132-2 in the section of the upper guide hole 132 of the air guide control plate 130.

In addition, since no rotational force is delivered to the upper air guide wing 110 and the lower air guide wing 120, the lower air guide wing 120 is in close contact with the lower portion within the air duct while the upper air guide wing 110 is in close contact with the upper portion within the air duct 20.

Preferably, an upper seating groove 26 in which the upper air guide wing 110 is seated is formed in the upper portion within the air duct 20, and a lower seating groove 28 in which the lower air guide wing 120 is seated is formed in the lower portion within the air duct 20, such that the upper air guide wing 110 is inserted into and in close contact with the upper seating groove 26 so as not to disturb the air flow, and the lower air guide wing 120 is also inserted into and in close contact with the lower seating groove 28 so as not to disturb the air flow.

Accordingly, the air flowing along the interior of the air duct 20 from the air conditioner may be discharged to the interior of the vehicle while forming straight wind without being tilted upward or downward.

Control of the Air Wind Direction Upward

Figure 5:
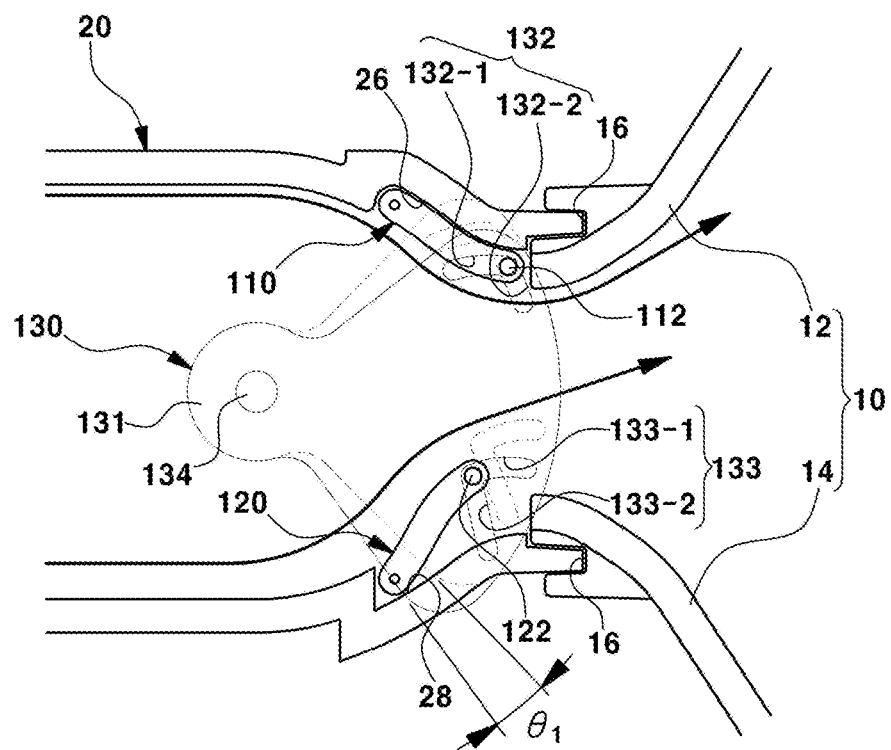
FIG. 5 is a side cross-sectional diagram illustrating a state where the air is discharged upward by the air vent device for a vehicle according to the present disclosure.

FIG. 5 is a diagram illustrating a state where the air is discharged upward by the air vent device for a vehicle according to the present disclosure.

When the one-way rotational force according to the driving of the actuator 140 is delivered to the rotary shaft 134, fastened to the hinge end 131 of the air guide control plate 130, in order to control the flow of the air, discharged to the interior of the vehicle, in an upward direction, the front end portion of the air guide control plate 130 is rotated at a predetermined first rotational angle ($\theta1$) downward from the neutral position.

At the same time, the upper guide pin 112 is moved from the end portion of the second upper path hole 132-2 of the upper guide hole 132 to the boundary portion between the first upper path hole 132-1 and the second upper path hole 132-2, and the lower guide pin 122 is moved from the end portion of the second lower path hole 133-2 of the lower guide hole 133 to the boundary portion between the first lower path hole 133-1 and the second lower path hole 133-2.

At this time, a distance from the rotation center point of the air guide control plate 130 to the end portion of the second upper path hole 132-2 and a distance from the rotation center point of the air guide control plate 130 to the boundary portion between the first upper path hole 132-1 and the second upper path hole 132-2 are substantially the same. Thus, even if the upper guide pin 112 is moved to the boundary portion between the first upper path hole 132-1 and the second upper path hole 132-2 as described above, the upper air guide wing 110 integrated with the upper guide pin 112 does not move but is kept inserted into and in close contact with the upper seating groove 26 of the air duct 20.

On the other hand, a distance from the rotation center point of the air guide control plate 130 to the boundary portion between the first lower path hole 133-1 and the second lower path hole 133-2 is shorter than a distance from the rotation center point of the air guide control plate 130 to the end portion of the second lower path hole 133-2. Thus, when the lower guide pin 122 is moved to the boundary portion between the first lower path hole 133-1 and the second lower path hole 133-2 as described above, the front end portion of the lower air guide wing 120 integrated with the lower guide pin 122 is rotated upward while being lifted upward.

Accordingly, the air flowing along the interior of the air duct 20 from the air conditioner may be discharged upward toward the interior of the vehicle while being guided by the lower air guide wing 120 which is rotated upward.

At this time, when the upper air guide wing 110 is seated in and inserted into the upper seating groove 26 of the air duct 20, the upper air guide wing 110 and the upper garnish 12 are arranged in a downward convex curve for the COANDA effect.

For reference, the COANDA effect refers to the characteristic in which the fluid flows along the wall surface of the curved surface.

Accordingly, a portion of the air flowing along the interior of the air duct 20 from the air conditioner flows upward toward the interior of the vehicle along the curved surface formed by the upper air guide wing 110 and the upper garnish 12, that is, the downward convex curved surface.

As described above, when the air guide control plate 130 is rotated at the first rotational angle (θ1) downward from the neutral position, the lower air guide wing 120 may guide the interior discharge direction of the air upward while rotating upward, thereby easily controlling the interior discharge direction of the air upward, and may allow a portion of the air to flow upward toward the interior of the vehicle along the curved surface, which is formed by the upper air guide wing 110 and the upper garnish 12, due to the COANDA effect, thereby controlling the upward wind direction of the air more easily.

Control of the Air Wind Direction Downward

Figure 6:
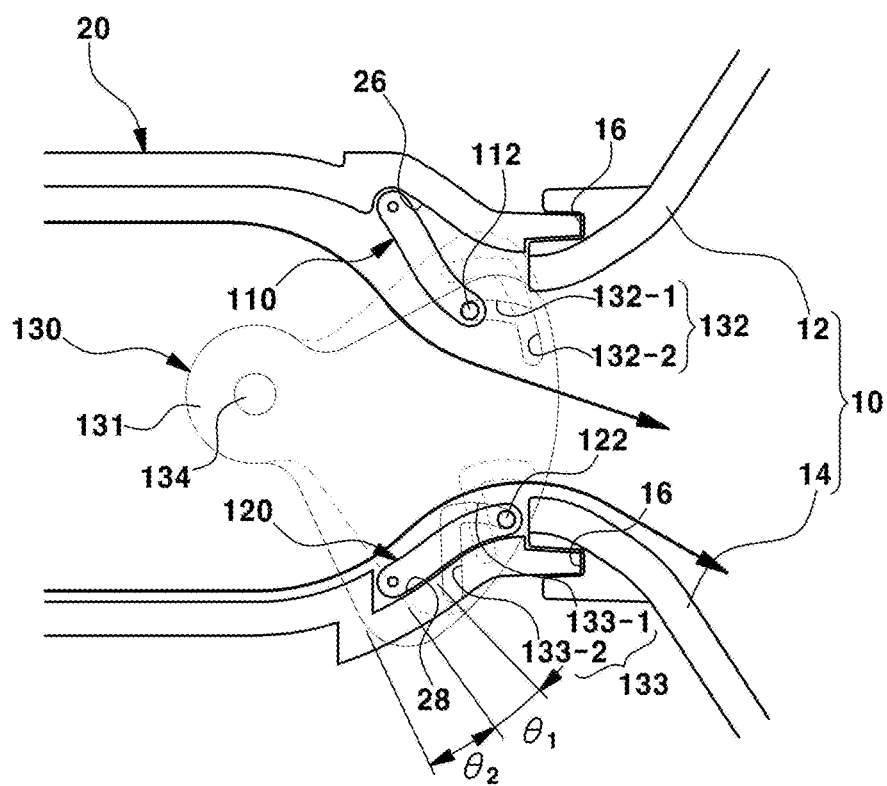
FIG. 6 is a side cross-sectional diagram illustrating a state where the air is discharged downward by the air vent device for a vehicle according to the present disclosure.

FIG. 6 is a diagram illustrating a state where the air is discharged downward by the air vent device for a vehicle according to the present disclosure.

When the one-way rotational force according to the driving of the actuator 140 is further delivered to the rotary shaft 134, which is fastened to the hinge end 131 of the air guide control plate 130, in order to control the flow of the air, discharged to the interior of the vehicle, in a downward direction, the front end portion of the air guide control plate 130 is further rotated downward from the position of the first rotational angle (θ1) to the position of a second rotational angle (θ2).

At the same time, the upper guide pin 112 is moved from the boundary portion between the first upper path hole 132-1 and the second upper path hole 132-2 of the upper guide hole 132 to the end portion of the first upper path hole 132-1, and the lower guide pin 122 is moved from the boundary portion between the first lower path hole 133-1 and the second lower path hole 133-2 of the lower guide hole 133 to the end portion of the first lower path hole 133-1.

At this time, the distance from the rotation center point of the air guide control plate 130 to the end portion of the first upper path hole 132-1 is shorter than the distance from the rotation center point of the air guide control plate 130 to the boundary portion between the first upper path hole 132-1 and the second upper path hole 132-2. Thus, when the upper guide pin 112 is moved to the end portion of the first upper path hole 132-1 as described above, the front end portion of the upper air guide wing 110 integrated with the upper guide pin 112 is rotated downward while being lifted downward.

On the other hand, the distance from the rotation center point of the air guide control plate 130 to the end portion of the first lower path hole 133-1 is longer than the distance from the rotation center point of the air guide control plate 130 to the boundary portion between the first lower path hole 133-1 and the second lower path hole 133-2. Thus, when the lower guide pin 122 is moved to the end portion of the first lower path hole 133-1 as described above, the front end portion of the lower air guide wing 120 integrated with the lower guide pin 122 rotated downward while being pulled downward and thus inserted into and in close contact with the lower seating groove 28 of the air duct 20.

Accordingly, the air flowing along the interior of the air duct 20 from the air conditioner may be discharged downward toward the interior of the vehicle while being guided by the upper air guide wing 110 which is rotated downward.

At this time, when the lower air guide wing 120 is seated in and inserted into the lower seating groove 28 of the air duct 20, the lower air guide wing 120 and the lower garnish 14 are arranged in the upward convex curve for the COANDA effect.

Accordingly, a portion of the air flowing along the interior of the air duct 20 from the air conditioner flows downward toward the interior of the vehicle along the curved surface formed by the lower air guide wing 120 and the lower garnish 14, that is, the upward convex curved surface.

As described above, when the air guide control plate 130 is further rotated downward from the position of the first rotational angle (θ1) to the position of the second rotational angle (θ2), the upper air guide wing 110 may guide the interior discharge direction of the air downward while rotating downward, thereby easily controlling the interior discharge direction of the air downward, and may allow a portion of the air to flow downward toward the interior along the curved surface, formed by the lower air guide wing 120 and the lower garnish 14, due to the COANDA effect, thereby controlling the downward wind direction of the air more easily.

While a number of exemplary aspects and embodiments have been discussed above, those of skill in the art will recognize that still further modifications, permutations, additions and sub-combinations thereof of the features of the disclosed embodiments are still possible. It is therefore intended that the following appended claims and claims hereafter introduced are interpreted to include all such modifications, permutations, additions and sub-combinations as are within their true spirit and scope.

The invention claimed is:

1. An air vent device for a vehicle, comprising:
   an upper air guide wing which has a rear end portion hinge-fastened within an air duct;
   a lower air guide wing which has a rear end portion hinge-fastened within the air duct;
   an upper guide pin which is formed on the upper air guide wing;
   a lower guide pin which is formed on the lower air guide wing;
   an air guide control plate fastened to the air duct to be rotatable by a rotary shaft, has an upper guide hole into which the upper guide pin is inserted, and the air guide control plate has a lower guide hole into which the lower guide pin is inserted; and
   an actuator mounted to the air duct to deliver a rotational force to the rotary shaft of the air guide control plate
   wherein an upper slot having the same moving trajectory as the upper guide pin and a lower slot having the same moving trajectory as the lower guide pin are formed by penetrating the air duct.

2. The air vent device of claim 1, wherein the upper guide hole of the air guide control plate into which the upper guide pin of the upper air guide wing is inserted comprises a first upper path hole which extends in the front-rear direction, and a second upper path hole which extends while bending downward from the first upper path hole, and
   wherein the lower guide hole of the air guide control plate into which the lower guide pin of the lower air guide wing is inserted comprises a first lower path hole which extends in the front-rear direction, and a second lower path hole which extends while bending downward from the first lower path hole.

3. The air vent device of claim 2, wherein when the air guide control plate is positioned at a neutral position, the lower guide pin is positioned at the second lower path hole of the lower guide hole while the upper guide pin is positioned at the second upper path hole of the upper guide hole, such that the lower air guide wing is in contact with the air duct while the upper air guide wing is in contact with the air duct, and the air is discharged in a straight direction.

4. The air vent device of claim 3, wherein when the air guide control plate is rotated at a predetermined first rotational angle downward from the neutral position, the lower guide pin is positioned at a boundary portion between the first lower path hole and the second lower path hole of the lower guide hole while the upper guide pin is positioned at the boundary portion between the first upper path hole and the second upper path hole of the upper guide hole, such that the lower air guide wing is rotated upward while the upper air guide wing is kept in close contact with the upper portion within the air duct, and the air is discharged in an upward direction.

5. The air vent device of claim 4, wherein when the air guide control plate is further rotated at a second rotational angle downward from the position of the first rotational angle, the lower guide pin is positioned at the first lower path hole of the lower guide hole while the upper guide pin is positioned at the first upper path hole of the upper guide hole, such that the lower air guide wing is close contact with the lower portion within the air duct while the upper air guide wing rotates downward, and the air is discharged in a downward direction.

6. The air vent device of claim 1, wherein an upper seating groove in which the upper air guide wing is seated and a lower seating groove in which the lower air guide wing is seated are formed on the air duct.

7. The air vent device of claim 6, wherein when the upper air guide wing is seated in the upper seating groove, the upper air guide wing and an upper garnish are arranged in a downward convex curve for a COANDA effect.

8. The air vent device of claim 6, wherein when the lower air guide wing is seated in the lower seating groove, the lower air guide wing and a lower garnish are arranged in an upward convex curve for a COANDA effect.

9. The air vent device of claim 1, wherein a fastening groove, into which the air duct is inserted and fastened in an air tight manner, is formed in an upper garnish and a lower garnish.

* * * * *